No Printed Specification Available
9757X
2 Sheets—Sheet 1.
S. BEEBE.
Dumping-Wagon.
Patented June 22, 1836.
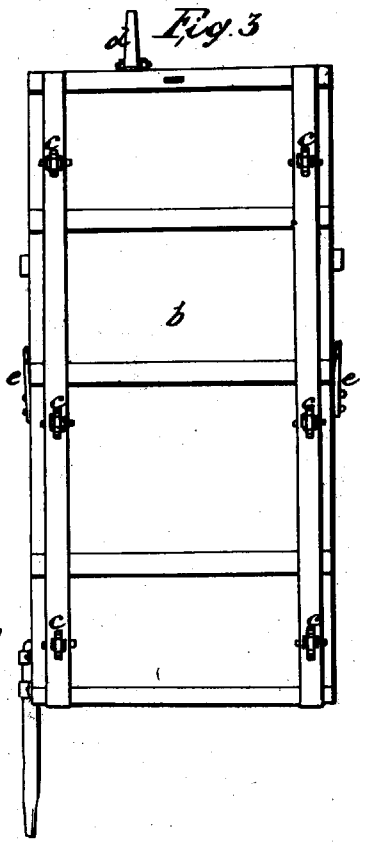
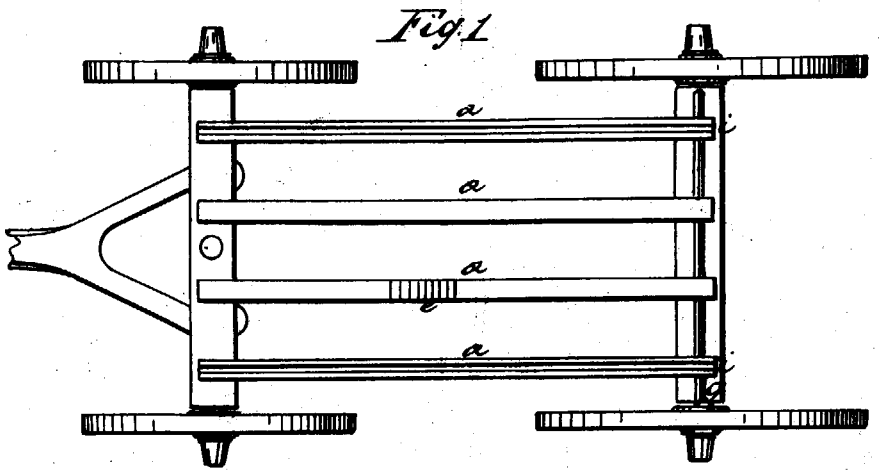
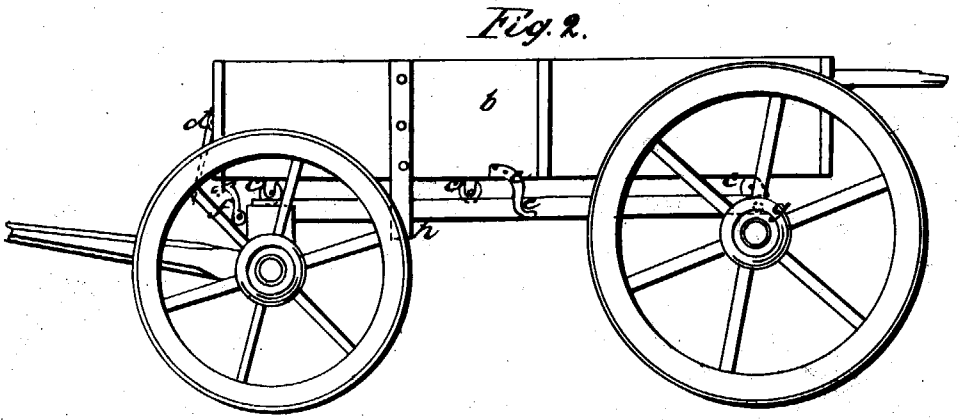
PETERS, PHOTO-LITHOGRAPHER, WASHINGTON, D. C.

9757X
2 Sheets—Sheet 2.
S. BEEBE.
TILTING WAGON.
Patented June 22, 1836.
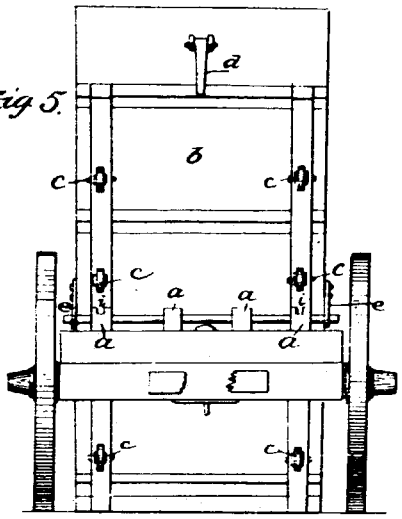
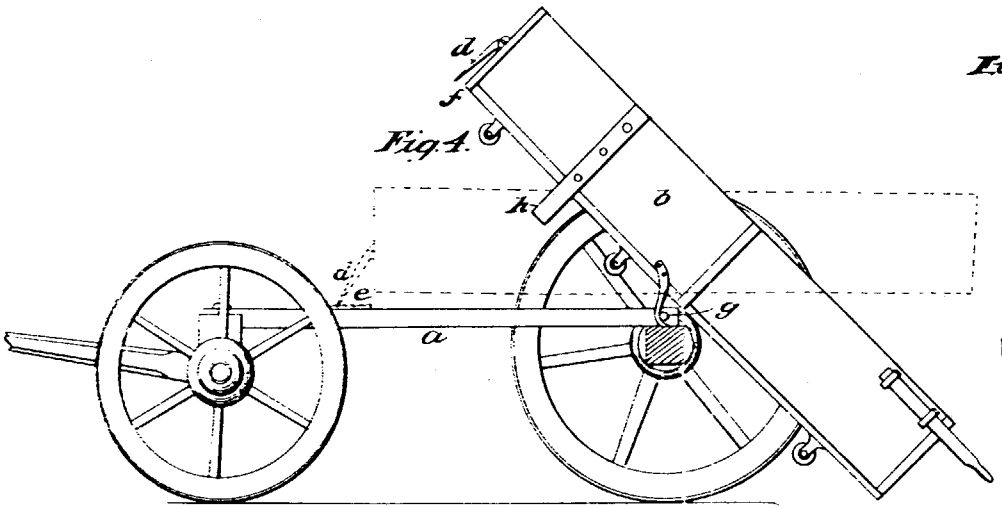
Patent Office Aug 22d 1836.
Sealed under the seal of the Commission of Patents in conformity with act of 17th March 1836.
Commission of Patents

9757X

June 22 1836

Stephen Beebe of Norwich Connecticut

Letters Patent.

The Schedule referred to in these Letters Patent and making part of the same containing a description in the words of the said Stephen Beebe himself of his improvement in tilting Waggons.

To all to whom these Presents shall come. Be it Known that I Stephen Beebe of Norwich in the County of New London and State of Connecticut have invented a new and useful improvement in Waggons Carriages and that the following is a full and exact description thereof. to wit. three or four Bars or strips of wood rest upon the axles of said Waggon parallel to each other. upon said bars the Body rests upon rollers. the body being moved backward on said rollers along said parallel bars a sufficient distance, tilts up. To prevents its rolling forward after it is rolled back & before it tilts. a piece of metal inserted into the front part of the body falls upon the teeth of a piece of iron fastened upon one of said parallel bars. The body is fastened down in front by hooks or bolts. and also in rear. As the Body moves backward hooks placed underneath the body catch upon a bar of metal running along over and parallel to the rear axle. to prevent it from running too far back. To prevent the body from moving eith side in front from the line of said parallel bars. as it moves back wards a slat or bar. is attached perpendicularly on each side of the forward part of the body running down below the body. The body is thrown back by a lever or screw. the rollers move in grooves in said bars. What I claim as my own invention and not previously known in the above described machine is the invention and application of the rollers: moving in said groove.

Witnesses
George Perkins
C. C. Chapman

Stephen Beebe

Drawing made by [illegible]